United States Patent
Hardy

(10) Patent No.: US 6,715,799 B2
(45) Date of Patent: Apr. 6, 2004

(54) CORRUGATED PIPE COUPLING HAVING SIX DEGREES OF FREEDOM

(76) Inventor: David J. Hardy, 726 Willliam St., River Forest, IL (US) 60305

( * ) Notice: Subject to any disclaimer, the term of this patent is extended or adjusted under 35 U.S.C. 154(b) by 0 days.

(21) Appl. No.: 10/123,461

(22) Filed: Apr. 16, 2002

(65) Prior Publication Data

US 2003/0193189 A1 Oct. 16, 2003

(51) Int. Cl.⁷ .............................................. F16L 27/12
(52) U.S. Cl. ........................ 285/223; 285/903; 285/226; 285/299
(58) Field of Search ............................... 138/121, 177; 285/903, 226, 299, 300, 301, 223; 92/34

(56) References Cited

U.S. PATENT DOCUMENTS

| | | | |
|---|---|---|---|
| 680,328 A | 8/1901 | Henderson | |
| 1,259,233 A | 3/1918 | Hartman | |
| 1,864,861 A | 6/1932 | Schaller | |
| 2,867,242 A | * 1/1959 | Harris et al. | 138/121 |
| 3,280,847 A | 10/1966 | Chisholm et al. | |
| 3,318,335 A | 5/1967 | Heller | |
| 3,638,536 A | * 2/1972 | Kleinwachter et al. | 92/92 |
| 4,108,050 A | * 8/1978 | Paynter | 92/48 |
| 4,721,030 A | * 1/1988 | Paynter | 92/92 |
| 4,753,833 A | 6/1988 | Fishgal et al. | |
| 4,865,357 A | 9/1989 | Brinegar | |
| 5,033,270 A | * 7/1991 | Hardt | 92/34 |
| 5,038,834 A | 8/1991 | Siegfried | |
| 5,882,046 A | 3/1999 | Thomas | |
| 5,927,344 A | 7/1999 | Nobileau | |
| 5,992,896 A | * 11/1999 | Davey et al. | 285/226 |
| 5,992,900 A | * 11/1999 | Heller | 285/114 |
| 6,056,018 A | 5/2000 | Renaud | |

FOREIGN PATENT DOCUMENTS

JP 05272674 A 10/1993

\* cited by examiner

*Primary Examiner*—Eric K. Nicholson
(74) *Attorney, Agent, or Firm*—Eric D. Cohen

(57) ABSTRACT

A pipe coupling for joining two sections of pipe provides six degrees of freedom where the pipe coupling includes an inlet portion, an outlet portion disposed opposite the inlet portion, and an intermediate portion disposed between the inlet and outlet portions for providing relative movement between the inlet portion and the outlet portion. The intermediate portion has a plurality of corrugations disposed about a circumference of the pipe coupling and each corrugation includes first and second arms diverging from a common vertex toward the inlet portion and outlet portion, respectively. The arms diverge at substantially a forty-five degree angle forming a V-shape, and each arm terminates at a transition area where each arm of the corrugation blends with the inlet portion and outlet portion, respectively.

55 Claims, 11 Drawing Sheets

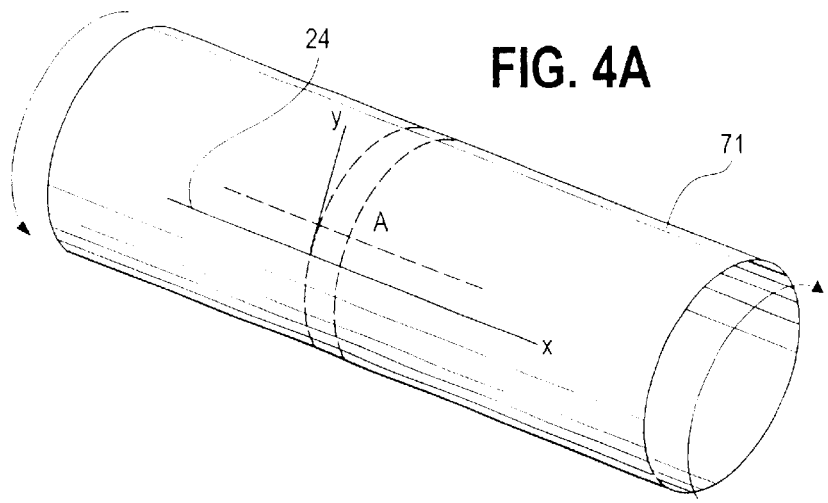
FIG. 4A
FIG. 4B
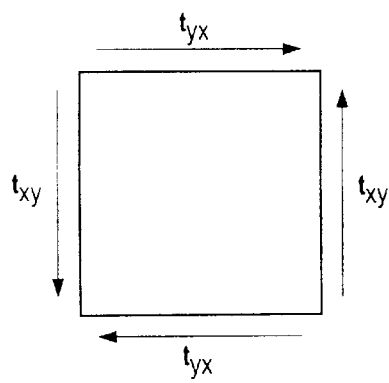
FIG. 4C
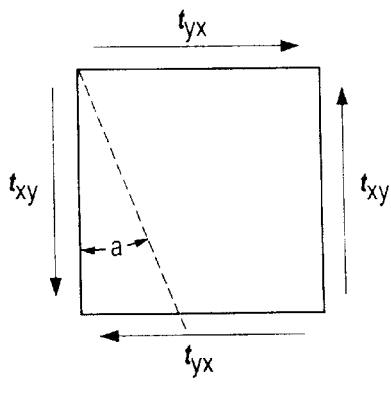
FIG. 4D
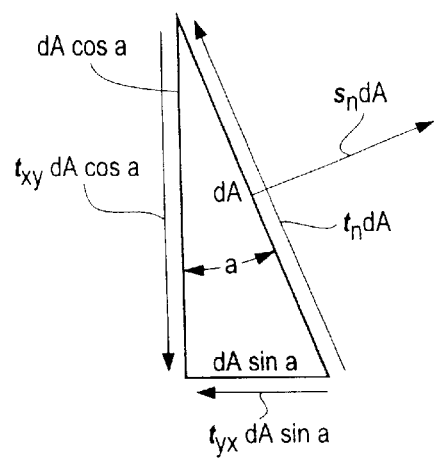

CORRUGATED PIPE COUPLING HAVING SIX DEGREES OF FREEDOM

FIELD OF THE INVENTION

The present invention relates generally to an apparatus for coupling two sections of pipe, and more specifically to a pipe coupling having corrugations that provide six degrees of freedom of movement.

BACKGROUND

Conduit and piping systems for conveying fluids, bulk materials and gases are used in a wide variety of applications. Such piping systems may be used in applications involving pipe line, exhaust systems, stationary piping systems, HVAC, slurry line, and the like.

Various components for such systems have been devised to accommodate different fluids, gases and other materials, and to operate in particular environments. For example, some of the components of such systems are fabricated from flexible metal hose, which offers the advantages of durability, flexibility, relatively low cost, and adaptability to various sizes, configurations and materials.

Flexible metal hose is known to interconnect components which move relative to each other. Some of the common configurations of flexible metal hose include spiral-wound, edge-interlocked hose wherein the edges of a strip of sheet metal are interlocked on a hose winding machine to permit limited deflection of the resulting flexible metal hose.

Corrugated flexible metal hose, on the other hand, can be roll-formed or spiral-wound using special rollers, which shape the corrugations in an annular manner. The corrugations provide flexibility and permit a corrugated pipe or hose section to be bent and shaped more easily than a comparable hose section with smooth walls. Moreover, corrugations can permit a hose section to be bent around a relatively tight radius, and can dissipate dynamic stresses associated with the vibration of the components to which the flexible hose section is attached. However, most spiral wound components do not provide a complete seal, especially in high-pressure applications. In such applications, special liners are used to achieve a seal, but this is expensive and complex to manufacture.

Exhaust systems for internal combustion engines are examples of a relatively severe environment in which the operating characteristics of flexible metal hoses can be used. Flexible metal hose sections are often used for connecting the exhaust pipes from vehicle internal combustion engines with manifold mufflers, tail pipes and other exhaust system components. Flexible metal hose sections are commonly used in the exhaust systems of tractors of tractor-trailer truck rigs because of their flexibility, temperature resistance and corrosion resistance when fabricated from suitable materials, such as stainless steel.

Exhaust systems in general, and vehicle exhaust systems in particular, must perform reliably under relatively severe operating conditions, which can include temperature extremes, corrosive environmental factors and dynamic stress loading. Dynamic stresses in an exhaust system can originate from vibrations associated with the engine and movement of the vehicle. Such dynamic stresses include axial, lateral, torsional, and bending forces, which can be accommodated, to some degree, by flexible metal hose with edge interlocking. However, such piping tends to be relatively unreliable. Additionally, use of special liners in spiral wound systems for use in exhaust system applications can be impractical because of the extreme temperature range in which the system must operate.

Corrugated flexible hose sections can have annular corrugations, such as a bellows-type arrangement, where the corrugations are disposed perpendicular to a longitudinal axis of the pipe. Such bellows-type configurations tend to be relatively efficient at dissipating vibrational energy along their entire lengths. Such annular bellows-type corrugation provides relative movement with five degrees of freedom, namely, 1) compression and extension along a longitudinal axis of the pipe or the "x-axis," 2) upward lateral offset within the "x-y" plane, 3) downward lateral offset within the "x-y" plane, 4) leftward lateral offset within the "x-z" plane, and 5) rightward lateral offset within the "x-z" plane.

However, piping with annular corrugations do not tolerate torsional or twisting forces about the x-axis. For example, some exhaust systems of internal combustion engines, and in particular, truck exhaust systems, have used annularly corrugated pipe couplings to connect various components. However, such systems tend to fail prematurely when subject to repetitive torsional stresses. Repeated dynamic torsional forces can lead to premature metal fatigue. When such systems begin to fail, leaks develop, which may pose a health and safety hazard, in addition to degrading engine performance. Total failure of the system results in physical separation of piping components.

It is desirable to have a flexible pipe coupling that permits movement in six degrees of freedom, including torsional or twisting movement, and which is economical to manufacture and is not susceptible to leaking.

SUMMARY

The disadvantages of present corrugated pipe couplings are substantially overcome with the present invention. More specifically, one specific embodiment of a pipe coupling for joining two sections of pipe provides six degrees of freedom where the pipe coupling includes an inlet portion, an outlet portion disposed opposite the inlet portion, and an intermediate portion disposed between the inlet and outlet portions for providing relative movement between the inlet portion and the outlet portion. The intermediate portion has a plurality of corrugations disposed about a circumference of the pipe coupling and each corrugation includes first and second arms diverging from a common vertex toward the inlet portion and outlet portion, respectively. The arms diverge at substantially a forty-five degree angle forming a V-shape, and each arm terminates at a transition area where each arm of the corrugation blends with the inlet portion and outlet portion, respectively.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIGS. 4A–4D are diagrammatic views illustrating free-body stress analysis;

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
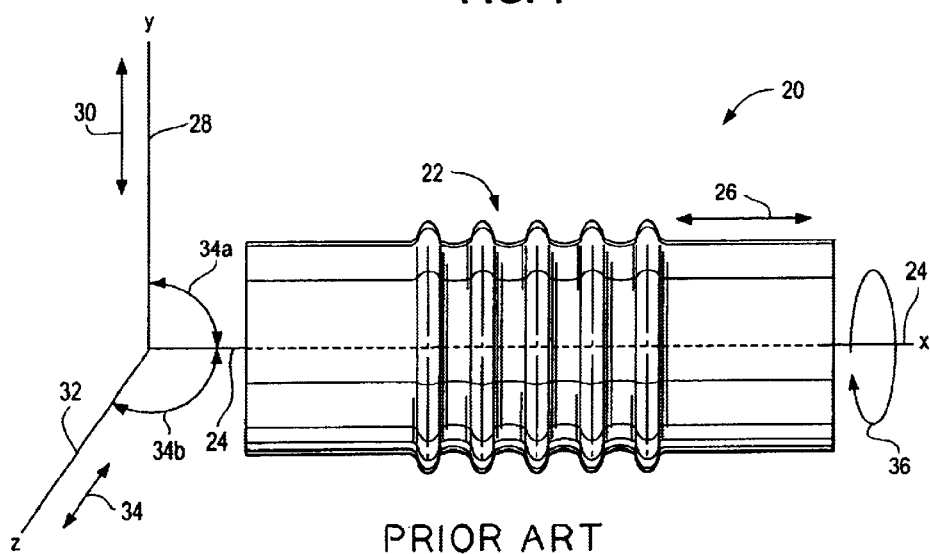
FIG. 1 is a perspective view of a known pipe having annular corrugations.

Referring now to FIG. 1, a known pipe 20 is shown having a plurality of annular corrugations 22, in the form of a bellows. As discussed above, such annular corrugations 22 provide movement in five degrees of freedom. For purposes of discussion with respect to the figures, the various axes of the pipe 20 are set forth below, where like reference numbers shall be used to denote like structures throughout the various views.

A longitudinal axis 24 of the pipe 20 is defined to be the "x-axis." The annular corrugations 22 permit compression and extension along the longitudinal or x-axis 24, as indicated by an arrow 26. A "y-axis" 28 in conjunction with the x-axis 24 define the "x-y" plane, and it can be seen that the annular corrugations 22 permit upward and downward lateral offset within the x-y plane, as indicated by an arrow 30. A "z-axis" (32), which is perpendicular to both the x-axis 24 and the y-axis 28, may be visualized as being perpendicular to or "coring out of" the page. The z-axis 32 in conjunction with the x-axis 24 define the "x-z" plane, and it can be seen that the annular corrugations 22 permit leftward and rightward lateral offset within the x-z plane, as indicated by an arrow 34. Bending about the z-axis is represented by reference numeral 34a, while bending about the y-axis is represented by reference numeral 30b. Torsional or twisting movement of the pipe cannot be accommodated by the annular corrugations of FIG. 1, which attempted movement is indicated by a circular arc 36.

Figure 2:
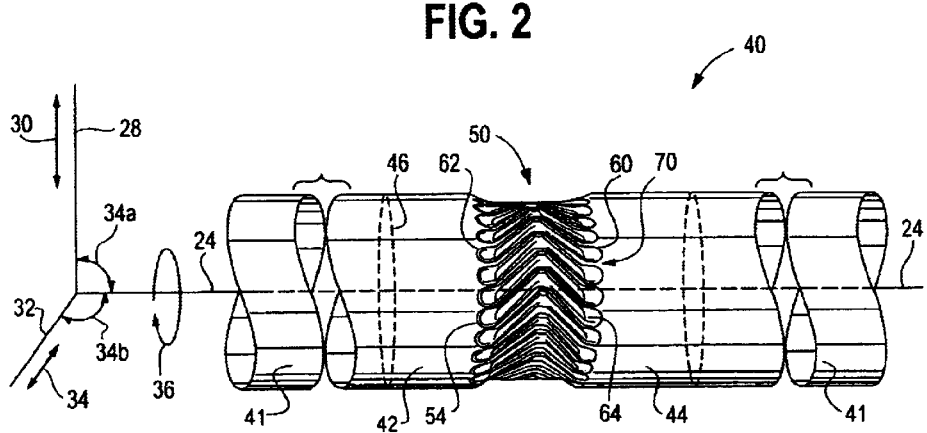
FIG. 2 is a perspective view of a specific embodiment of a pipe coupling showing V-shaped corrugations, according to the present invention.

Referring now to FIG. 2, a specific embodiment of a pipe coupling 40 is shown (also referred to as the "pipe"). The pipe coupling 40 is configured to couple two segments of pipe 41, which segments of pipe connect to an inlet portion 42 of the pipe coupling and an outlet portion 44 of the pipe coupling, respectively. Any suitable known method may be used to couple the pipe segments 41 to the pipe coupling 40, such as clamps 46 (shown in outline form only), welds, rivets, and the like. The pipe coupling 40 permits relative movement between the segments of pipe 41. The pipe coupling 40 may be used in many different applications, such as exhaust systems, HVAC, pressurized fluid flow, pressurized gas flow, slurry flow, and the like.

An intermediate portion 50 is disposed between the inlet portion 42 and the outlet portion 44, which intermediate portion may include a plurality of corrugations or deformations 54. The corrugations 54 reduce localized stress imposed by torsional movement of the pipe segments 41 relative to the pipe coupling 40. The same set of axes as shown in FIG. 1 will be used for the description herein. The corrugations 54 permit torsional or twisting movement about the x-axis 24, as will be described below in greater detail.

Figure 3A:
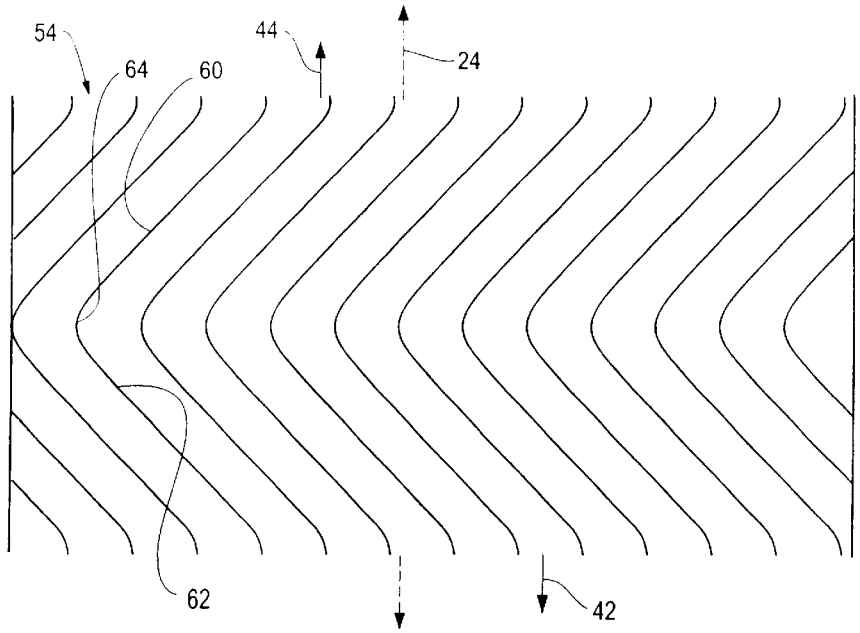
FIG. 3A is a pictorial view of the corrugations of FIG. 2 showing V-shaped corrugations.

Referring now to FIGS. 2 and 3A, FIG. 2 is a perspective view of the V-shaped corrugations 54 formed in the pipe coupling 40, while FIG. 3A is a pictorial view or "line drawing" of the V-shaped corrugations shown in FIG. 2 as if the tube or pipe coupling in which the corrugations are formed were split or separated along a longitudinal seam and laid flat. The corrugations 54 may be formed in the pipe coupling 40 in either the negative z-axis direction or the positive z-axis direction. As shown in FIG. 2, the corrugations 54 are formed in the negative z-axis direction, meaning that they are recessed into and below the surface of the pipe coupling 40 (toward the center of the pipe). However, the corrugations 54 may also be formed in the positive z-axis direction, essentially bulging out from the surface of the pipe (away from the center of the pipe), without departing from the scope of the invention. The pipe coupling 40 is generally directed to relatively "thin-walled" tubing, as typically defined by the ratio of the tube thickness to its diameter, as is known in the art. This invention also applies to heavier-walled tubing, such as a pipe having a thickness to diameter ratio of about 1:40 or greater. This may be, for example, a pipe having a wall thickness of 1/32 of an inch and having a diameter of 1.25 inches. Another example may be a water-main pipe made of metal six inches thick but having a diameter of twenty feet. Indeed, the present invention is applicable to such a massive pipe.

As shown in the specific embodiment of FIGS. 2 and 3A, the corrugations 54 are oriented at substantially a forty-five degree angle relative to the longitudinal axis 24 of the pipe coupling 40. As shown, the corrugations 54 are disposed continuously about the circumference of the pipe coupling 40. Note that the corrugations 54 may be of any suitable length without departing from the scope of the invention. Longer corrugations 54 accommodate a greater degree of torsional flexibility as well as a greater number of corrugations.

Each corrugation 54 includes a first arm 60 and a second arm 62, which arms ("corrugation arms") diverge from a common vertex 64, and extend toward the inlet portion 42 and the outlet portion 44, respectively. The arms 60, 62 diverge at substantially a forty-five degree angle forming a V-shape or "chevron." Accordingly, the vertices 64 of the corrugations 54 are aligned in a plane perpendicular to the longitudinal axis 24 of the pipe coupling 40. Of course, it is immaterial whether the vertices 64 point to the left or to the right. Each arm 60, 62 may terminate at a transition area or region 70 where each arm of the corrugation 54 "blends" smoothly with the inlet portion 42 and the outlet portion 44, respectively. The shape or configuration of the transition area 70 will be discussed in greater detail below.

Note that the term "a substantially forty-five degree angle" may mean in the range of forty-five degrees, and such angle may be in the range of forty degrees to fifty degrees. There is no sharp dividing line with respect to the angle. However, optimum performance is achieved using a forty-five degree angle, and performance of the pipe coupling 40 degrades as the angle deviates from forty-five degrees, as will be shown below with respect to a mathematical analysis.

Figure 3B:
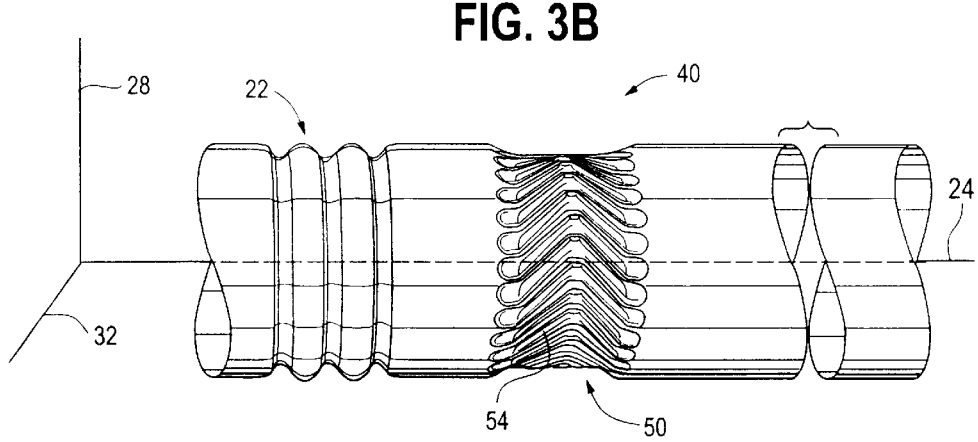
FIG. 3B is a pictorial view of a pipe having known annular corrugations and corrugations according to the present invention to provide six degrees of freedom.

Note that the specific embodiment of FIGS. 2 and 3A ("Chevron" pattern) do not provide freedom of movement in six degrees of freedom. Rather, this specific embodiment provides freedom of movement in torsion only. Referring now to FIG. 3B, to accommodate six degrees of freedom, the pipe coupling 40 is shown having known annular corrugations 22 in addition to having V-shaped or Chevron-type corrugations 54 in accordance with the specific embodiment of FIGS. 2 and 3A. The annular corrugations 20 provide the first five degrees of freedom described above, while the V-shaped corrugations 54 provide torsional flexibility (twisting along the x-axis) such that the pipe coupling 40 provides six degrees of freedom. Further, the annular corrugations need not be present in the same physical piece of pipe coupling as the corrugations of the embodiments described herein. Rather, two separate pipe couplings may be coupled together to provide six degrees of freedom. Note that the annular corrugations 22 of FIG. 3B are essentially the same as the annular corrugation of FIG. 1 except that the corrugations of FIG. 3B are recessed into the tube in the z-axis direction.

The basis for the orientation of the corrugations 54 originates from a stress analysis of the pipe coupling 40. Compression or extension forces imposed on a straight tube along the longitudinal axis 24 of the tube results in compression and extension stresses along that axis. When formed into the tube or pipe 20 (FIG. 1), annular corrugations 22 (FIG. 1), such as those shown in FIG. 1, function as springs and deflect in response to the incident forces. Annular corrugations add flexibility to the tube 20 (FIG. 1) because they are oriented perpendicular to the stresses that would be imposed in their absence.

Under bending and lateral offset displacements, the annular corrugations 22 (FIG. 1) function similarly. The resulting stresses that would be imposed by these displacements can be broken into compression and extension stresses. These stresses would be oriented along the longitudinal axis 24 of the pipe 20 (FIG. 1) and therefore, the presence of the annular corrugations 22 (FIG. 1) would add flexibility in these degrees of freedom.

Using the same analysis as above, to add flexibility in the sixth degree of freedom, that is, torsion or twisting about the longitudinal axis 24, the corrugations are preferably oriented perpendicular to the compression and extension stresses that would be imposed on a straight pipe under torsional loading. To determine the direction of these stresses, we look at a free body diagram of a differential section of a generic tube or pipe 71, as shown in FIGS. 4A–4D. For purposes of the analysis, the pipe 71 is assumed to be a thin walled tube where the wall thickness is less than one percent of the radius of the tube.

As shown in FIG. 4A, the cylindrical tube 71 is subjected to a torsional moment oriented about the longitudinal axis 24 of the tube. A differential section is taken from the surface of the tube 71 at point labeled "A." A free body diagram of the differential section is shown in FIG. 4B where $t_{yx}$ and $t_{xy}$ represent the shearing stresses incident on the section. Because the body is at rest, $t_{xy}$ and $t_{yx}$ are of equal magnitude.

To determine the other stresses imposed on the section, an arbitrary plane is defined by angle "a" illustrated in FIG. 4C. FIG. 4D illustrates the stresses incident upon the differential section where "$s_n dA$" represents the tensile stress on the body. Because the body is at rest, the sum of the stresses in any given direction must equal zero. Therefore, $$t_n dA - (t_{xy} dA \cos a)(\cos a) - (t_{yx} dA \sin a)(\sin a) = 0$$

Because $t_{xy} = t_{yx}$ then $$t_n = t_{xy}(\cos^2 a - \sin^2 a) = t_{xy} \cos 2a$$

Similarly, $$s_n dA - (t_{xy} dA \cos a)(\sin a) - (t_{yx} dA \sin a)(\cos a) = 0$$

from which $$s_n = 2t_{xy}(\cos a)(\sin a) = t_{yx} \sin 2a$$

From the above calculations, it can be seen that the maximum shear stress ($t_n$) occurs in a plane where the angle a=0. This corresponds to a plane that is perpendicular to the axis of the tube. Similarly, it is apparent that the maximum tensile stress ($s_n$) occurs in a plane where 2a=90 degrees or angle a=45 degrees.

Applying these findings to the analysis above, in order to add flexibility in the sixth degree of freedom, namely torsion or twisting, the corrugations are preferably oriented at a forty-five degree angle from the axis 24 of the tube. Any significant departure from this orientation will reduce the torsional elasticity of the corrugations and reduce their effectiveness.

Figure 5A:
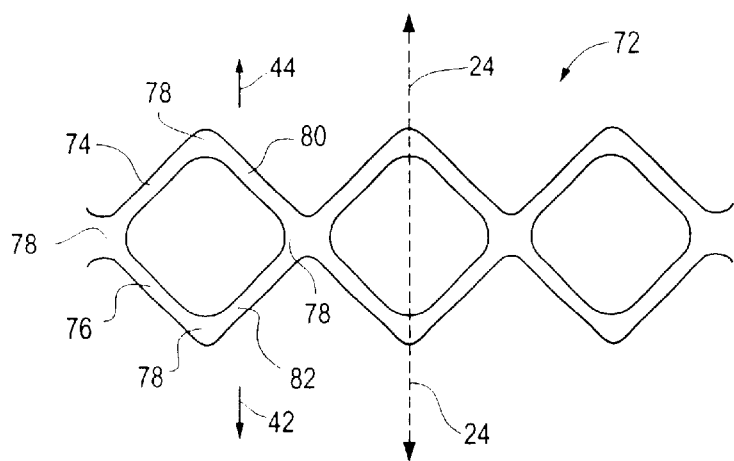
FIG. 5A is a pictorial view of a specific example of an alternate embodiment showing diamond-like corrugations.
Figure 5B:
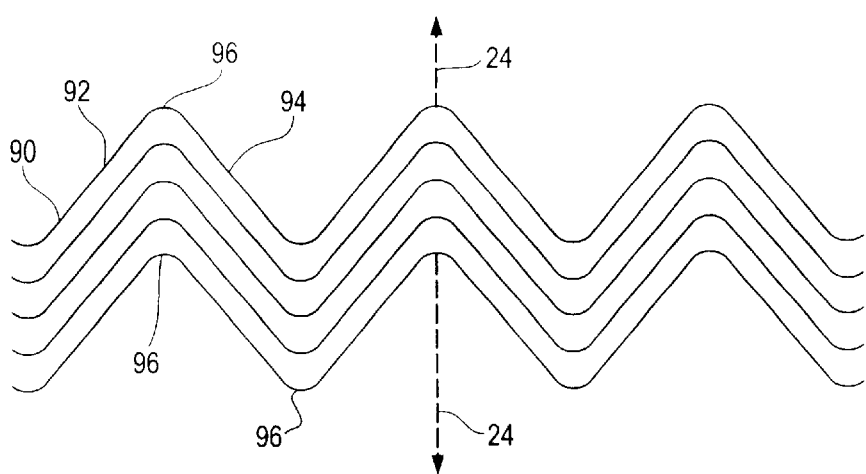
FIG. 5B is a pictorial view of a specific example of an alternate embodiment showing wave-like corrugations.
Figure 5C:
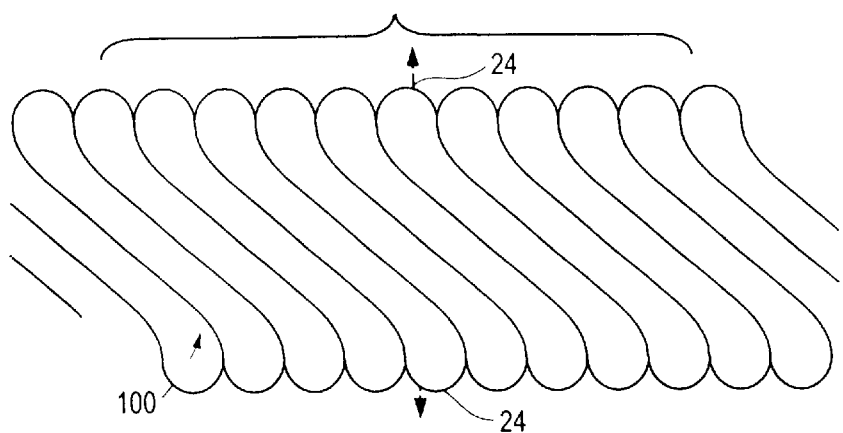
FIG. 5C is a pictorial view of a specific example of an alternate embodiment showing spiral-like corrugations.

Referring now to FIGS. 2 and 5A–5C, FIGS. 5A–5C are pictorial representations (line drawings) of various alternate embodiments of the geometry of the corrugations. The corrugations of the pipe coupling 40 are shown as if the tube or pipe in which the corrugations are formed was split or separated along a longitudinal seam and laid flat. Note that certain structures of the pipe coupling 40 are referred to in FIGS. 5A–5C even though the corrugations in FIGS. 5A–5C are of a different configuration than that shown in FIG. 2.

With respect to FIGS. 2 and 5A, corrugations 72 resemble a "diamond-like" pattern. The diamond pattern ("diamond-like corrugations") continues around the entire circumference of the pipe coupling 40, essentially defining the intermediate portion 50. Note that for purposes of clarity and illustration only, the transition region 70 associated with the corrugations 72 is not shown, but will be described below in greater detail. For similar reasons, the transition regions are not specifically shown in FIGS. 3A, 5B, and 5C. The diamond-like corrugations 72 include a first arm 74 and a second arm 76, which arms diverge from a common vertex 78, and extend toward the inlet portion 42 and the outlet portion 44, respectively, much in the same way as shown in the embodiment of FIG. 3A. Again, the arms 74, 76 diverge at substantially a forty-five degree angle from the vertex 78. In this specific embodiment, however, the diamond-like corrugation 72 includes a third arm 80 and a fourth arm 82, the ends of which meet the ends of the first and second arms 74, 76. The third and fourth arms 80, 82 may be thought of as a "mirror-image" of the first and second arms 74, 76. Vertices 78 of each diamond-like corrugation 72 meet along the circumference of the pipe coupling 40 to form a continuous "band" of diamond-like corrugations about the circumference of the pipe coupling. Note that unlike the V-shaped configuration of FIGS. 2 and 3A, the diamond-like configuration of FIG. 5A does, by itself, provide six degrees of freedom of movement without the use of the annular corrugations.

Referring now to FIGS. 2 and 5B, specific illustrated corrugations 90 resemble a "wave-like" pattern. The wave-like corrugations 90 continues around the entire circumference of the pipe coupling 40, essentially defining the intermediate portion 50. The wave-like corrugations 90 include a first arm 92 and a second arm 94, which arms diverge from a common vertex 96 Again, the arms 92, 94 diverge at substantially a forty-five degree angle from the vertex 96. In this specific embodiment, however, the arms 92, 94 of the wave-like corrugation do not extend toward the inlet 42 and outlet portions 44, but rather, extend to the next arm pair along the circumference of the pipe coupling 40. The wave-like corrugations 90 may disposed about the entire circumference of the pipe coupling 40 to form a continuous corrugated band. Further, multiple parallel bands of the wave-like corrugations 90 may be disposed along the longitudinal axis 24 of the pipe coupling separated by a predetermined distance, depending upon the size and geometry of the pipe coupling 40.

In the illustrated embodiment of FIG. 5B, five parallel wave-like corrugation bands 90 may be included, but any suitable number may be included. In FIG. 5B, each wave-like corrugation band 90 is shown as a line without thickness for purposes of illustration and clarity only. However, it will be appreciated that such bands have geometrical dimensions, such as is shown in the various perspective views, and in particular, FIG. 2. This way of illustrating the corrugations is also applicable to all of the "flat" pictorial views. Note that unlike the V-shaped configuration of FIGS. 2 and 3A, the wave-like configuration of FIG. 5A does, by itself, provide six degrees of freedom of movement without the use of the annular corrugations.

Figure 6A:
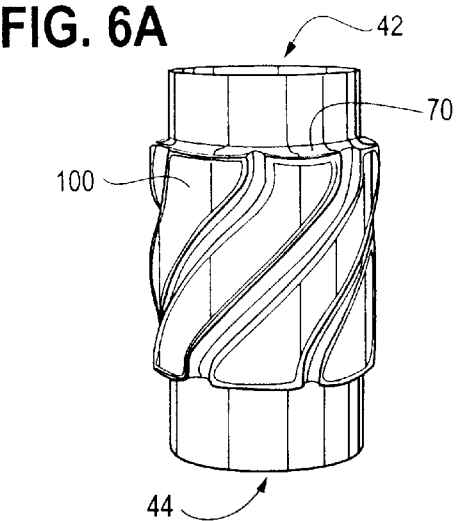
FIGS. 6A–6C are perspective views of alternate embodiments of the spiral-like corrugation of FIG. 5C.

With respect to FIGS. 2 and 5C, corrugations 100 are disposed in a spiral or diagonal pattern around the entire circumference of the pipe coupling 40, essentially defining the intermediate portion 50. Such diagonal-like corrugations 100 are also shown in the perspective views of FIGS. 6A–6C, which figures particularly show the shape of the transition area 70, which will be described in greater detail below. In the embodiment of FIG. 5C (and FIGS. 6A–6C), each corrugation 100 is self-contained, meaning that it is a single "bulged" portion that does not connect to another corrugation. As described above, the direction of formation of the corrugation 100, i.e., whether bulging out from the pipe coupling 40 or whether recessed or depressed into the pipe coupling or whether slanted to the left or right, is immaterial. Each corrugation 100 is preferably disposed at substantially a forty-five degree angle relative to the longitudinal axis 24 of the pipe coupling 40. As will be discussed hereinafter, each end of the corrugation 100 terminates in a transition area 70 where the corrugation blends with the inlet portion 42 and the outlet portion 44. Note that this specific configuration only provides torsional freedom of movement.

Referring back to FIGS. 2, 3A, 5A, and 5B, another feature of the V-shaped corrugation configuration of FIGS. 2 and 3A, and the diamond-like corrugation configuration of FIG. 5A is that the length of the pipe coupling 40 remains substantially constant during torsional deformation. This is in contrast to the spiral-like corrugations shown in the specific embodiments of FIGS. 5C and 6A–6C, which undergo some degree of shortening or movement along the longitudinal axis 24 when subject to torsional movement. This is similar to the analogy of a cord or rope that becomes shorter when twisted.

Because the configuration and orientation of the arms 60, 62 of the V-shaped configuration and the arms 74, 76, 80, 82 of the diamond-like configuration, one arm or set of arms will contract or "pull in" while the other arm or set of arms will expand or "push out" so that the overall length of the pipe coupling 40 measured from the inlet portion 42 to the outlet portion 44 remains substantially unchanged during torsional strain. This reduces that amount of stress exerted or transferred to other components in the system to which the pipe coupling 40 is directly or indirectly connected.

Because the corrugations 54 (FIGS. 2 and 3A), 72 (FIG. 5A), 90 (FIG. 5B), 100 (FIG. 5C) attach to or "blend" with a round cylinder on each end, namely the inlet portion 42 and the outlet portion 44, the transition area 70 (FIG. 2) must exist from each corrugation to the corresponding inlet and outlet portion. Under torsional loading, the corrugations deflect and, by design, the inlet 42 and outlet portions 44 disposed on either end of the corrugations do not. This condition creates relative motion between the corrugations and the inlet 42 and outlet portions 44, respectively. Therefore, the shape of the ends of the corrugations, namely, the transition areas 70, must redirect these deflections and their related stresses in such a manner so as to minimize stress concentrations. From a practical stand point, the shape is preferably one that accommodates manufacturing, as will be discussed below.

Referring now to FIGS. 2 and 7A–7E, the shape of the transition area 70 of the corrugations 100 are particularly shown. FIGS. 7A–7E shown the corrugations 100 as if the intermediate area 50 of the pipe coupling 40 were cut along a longitudinal seam and then "unrolled" and laid flat in the x-y plane with the corrugations protruding "out of the page" in the positive z-axis direction. For purposes of illustration only, the spiral corrugation configuration of FIG. 5C is used to describe the transition area 70, although such discussion applies to all corrugations.

One feature of the transition area 70 that contributes to the performance of the corrugations 100 is the shape of the transition area in the x-y plane. The shape of the transition area 70 in the x-y plane may be one in which the forty-five degree corrugation 100 blends smoothly with either the longitudinal axis of the pipe coupling 24 or tube (x axis), or a plane perpendicular to that of the pipe coupling or tube (the y axis). This blending is preferably gradual and in a shape defined by a second order or third order function of x, such as, for example, a circle, a sine wave or an ellipse. The constants for such functions depend on the modulus of elasticity of the pipe coupling material and the dimensions of the corrugation.

Figure 6B:
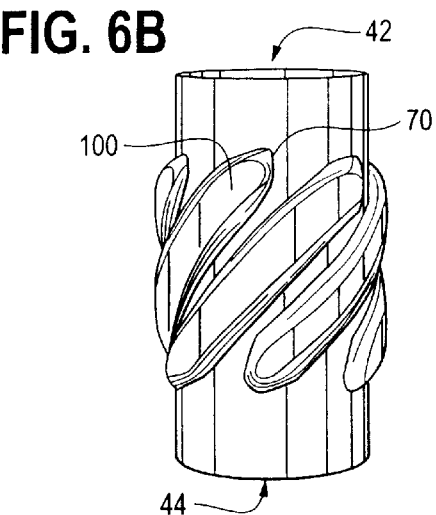
Figure 6C:
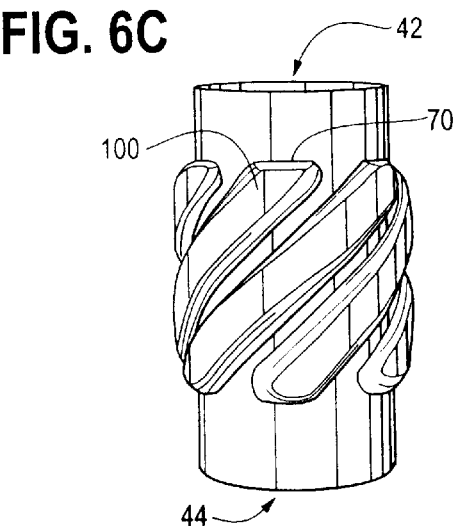
Figure 7A:
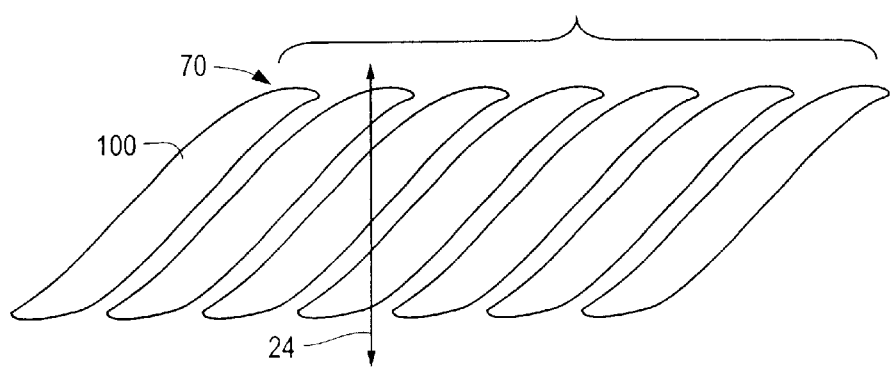
FIGS. 7A–7E are pictorial views of alternate embodiments of the transition areas of the corrugations.

FIG. 7A illustrates one specific embodiment showing a configuration of a single set of forty-five degree corrugations that blend in an elliptical manner with a plane perpendicular to the longitudinal axis 24 of the pipe coupling 40. This transition area may correspond to the corrugations of FIG. 6C. The transition area of each corrugation 100 may have smooth radii on the ends.

Figure 7B:
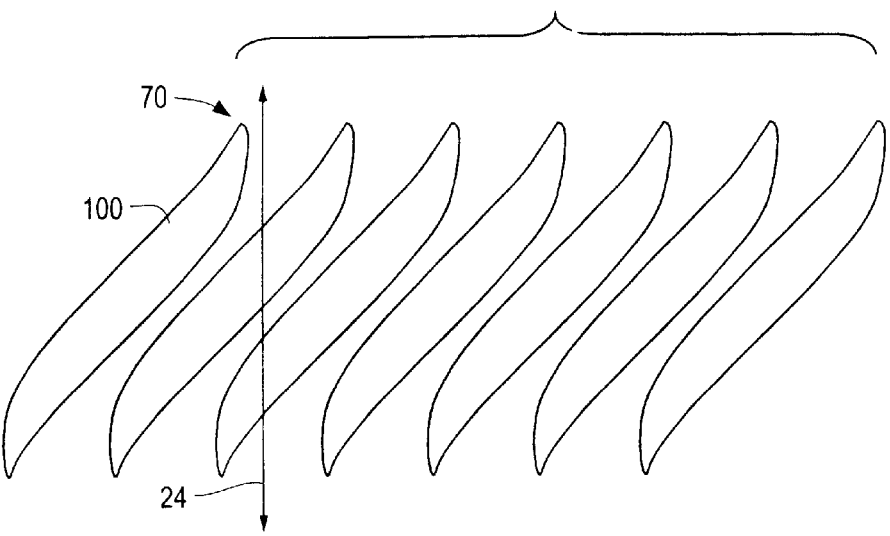
Figure 7C:
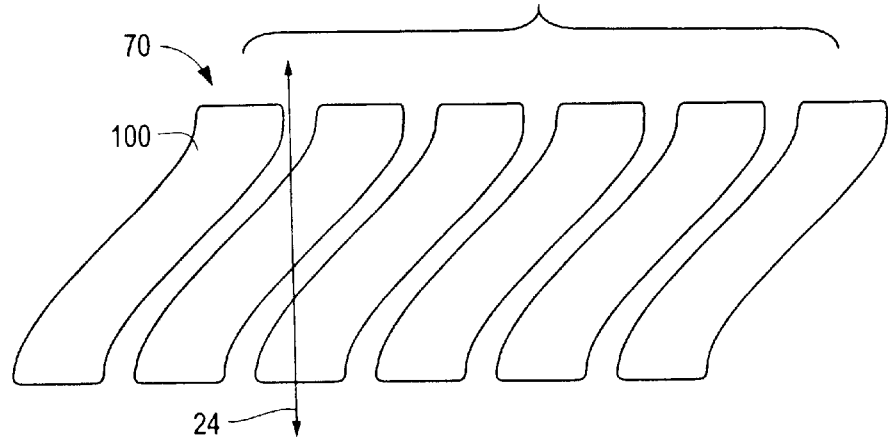
Figure 7D:
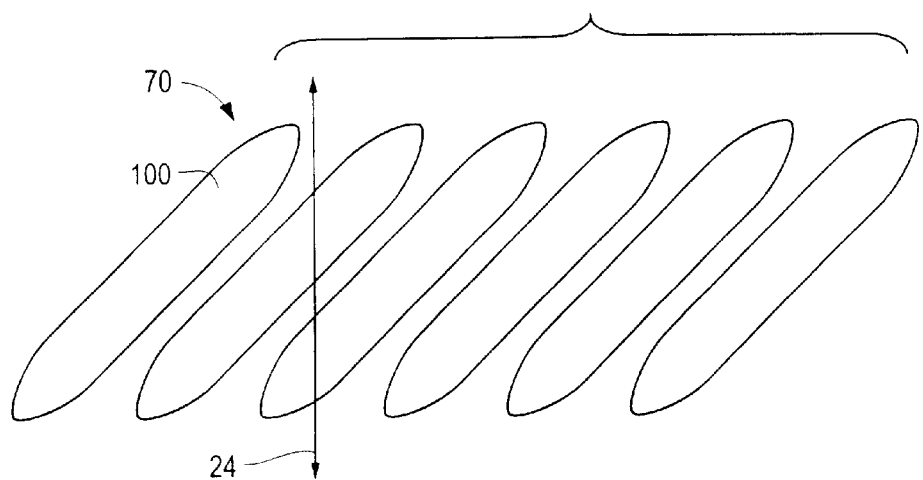

Similarly, FIGS. 7C and 7D illustrate the transition area 70 configuration that blends with a plane parallel to the longitudinal axis 24 of the pipe coupling 40 or tube, which also has a smooth radii on the ends of the corrugation. These transition areas 70 may correspond to the corrugations of FIGS. 6A and 6B, respectively.

Figure 7E:
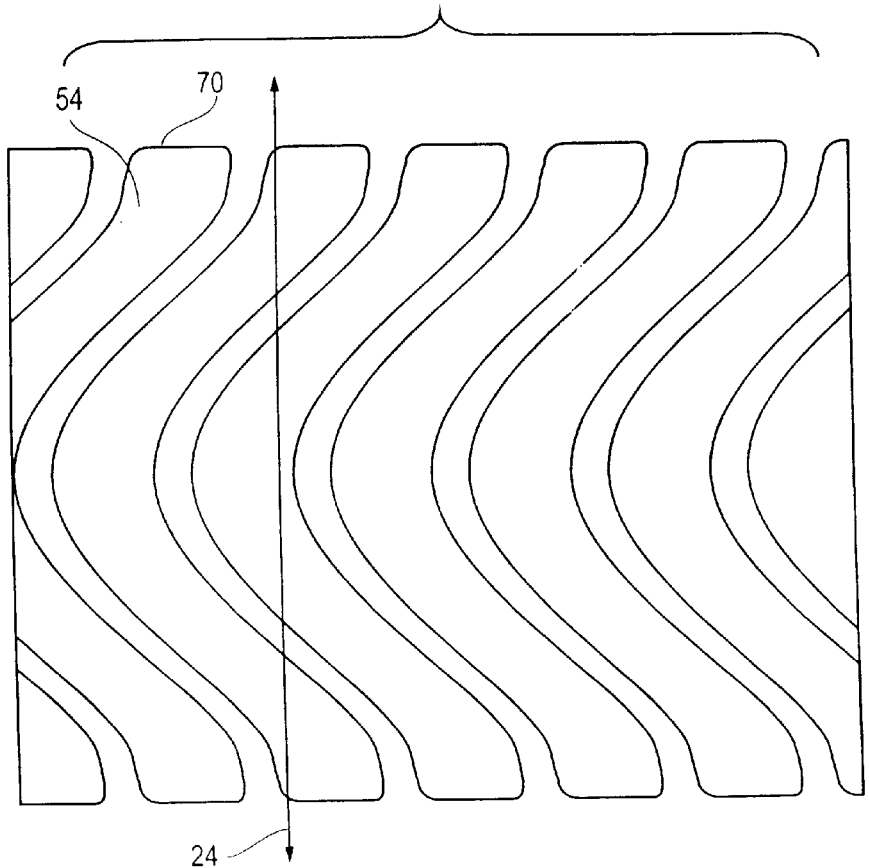

FIG. 7D illustrates a transition area 70 that may represent a combination of both of the above-described transition areas. One side of the corrugation blends with the longitudinal axis 24 of the pipe, while the other side of the corrugation blends with an axis perpendicular thereto. Finally, FIG. 7E illustrates a specific transition area 70 for the corrugations of a V-shaped pattern, but not necessarily the corrugation pattern of FIGS. 2 and 3A. Note however, that many other configurations of the shape of the transition area 70 can be obtained by using various combinations of the above geometry along with multiple sets of corrugations in "alternating" directions, such as the "alternating" arms shown in the configurations having a chevron or V-like pattern.

Note that with reference to the transition area not specifically shown in FIG. 5A (the diamond-like corrugation pattern), the transition area for the vertices pointing leftward or rightward would form a smooth curve from the vertex 78 to the longitudinal axis 24 of the pipe coupling. Verticies pointing upwardly toward the top of the page and downwardly toward the bottom of the page would form a smooth curve from the vertex 78 to an axis perpendicular to the longitudinal axis 24 of the pipe coupling 40. This also applies to the vertices of the transition area not specifically shown in FIG. 5B, wherein a smooth curve from the vertex 96 to the longitudinal axis 24 of the pipe coupling is preferably formed.

Another feature of the transition area that contributes to the performance of the corrugations is the shape of the transition area in the z-plane, which may be thought of as the contour of the height of the corrugation. In general, the higher the relative height of the corrugation, the more flexible it is. Therefore, although the final transition of the corrugation to the cylindrical portion of the tube (in the z axis) should be a smooth radius (i.e., not a rectangular shape) the height should remain at the nominal height of the corrugation for as long as possible.

Figure 8A:
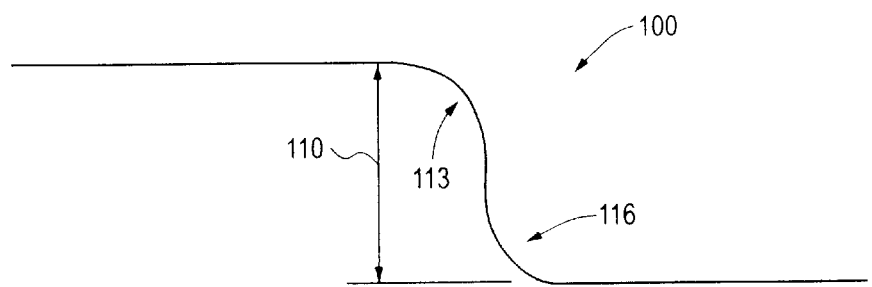
FIG. 8A is a pictorial side view of a specific transition area of a corrugation illustrating the change in height of the corrugation.
Figure 8B:
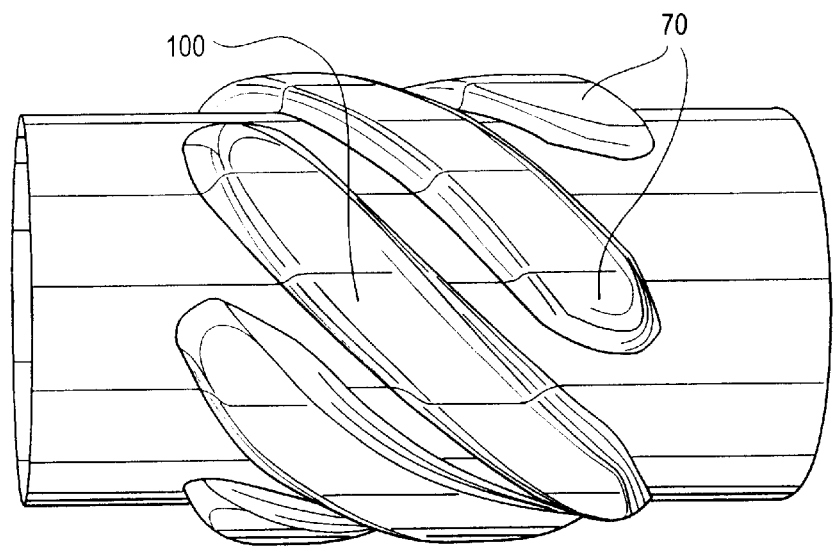
FIG. 8B is a perspective view of the transition area of FIG. 8A.

Referring now to FIGS. 8A–8B, FIG. 8A illustrates a cross-sectional side view of a preferable contour of a corrugation. Note that a thickness or height 110 of the corrugation 100 remains relatively constant, meaning that the height of the body portion of the corrugation remains relatively constant until just toward an end radius of curvature 113, where it transitions. As described above, the transition in height is a smooth radius of curvature 113 and is not square or sharp in any way. FIG. 8B is a perspective view of the corrugation of FIG. 8A, and further illustrates the shape of the transition area 70 with respect to its height transition. Corrugations having transition areas 70 with cross-sections as shown in FIGS. 8A–8B permit the geometries in the x-y plane to remain flexible and perform well. Radius of curvature 113 and radius of curvature 116 is preferably substantially equal and each radius of curvature is preferably less then one-half of the height 110 of the corrugation, but also generally greater than one-quarter of the height of the corrugation. This essentially defines what is referred to as an abrupt transition, but which is not sharp.

Figure 8C:
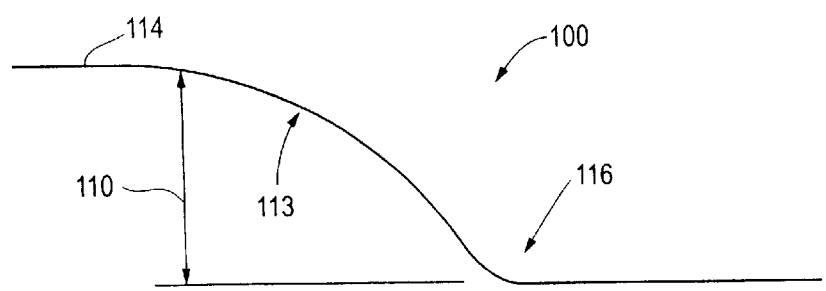
FIG. 8C is a pictorial side view of an undesirable transition area.
Figure 9A:
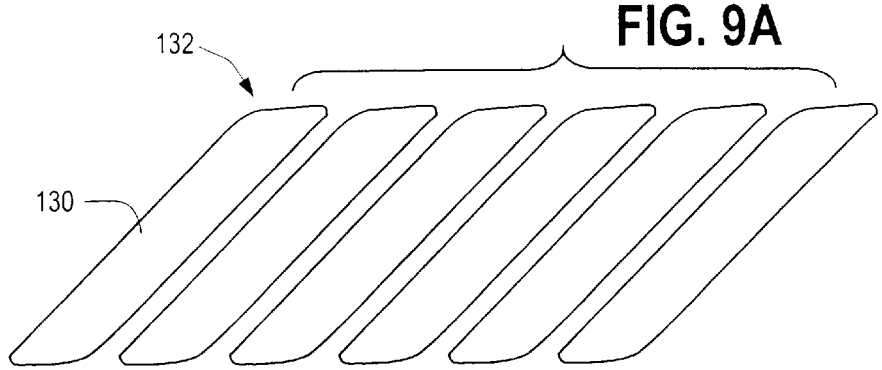
FIGS. 9A–9D are pictorial views of alternate embodiments of approximations of the shape of the transition area of the corrugations.
Figure 9B:
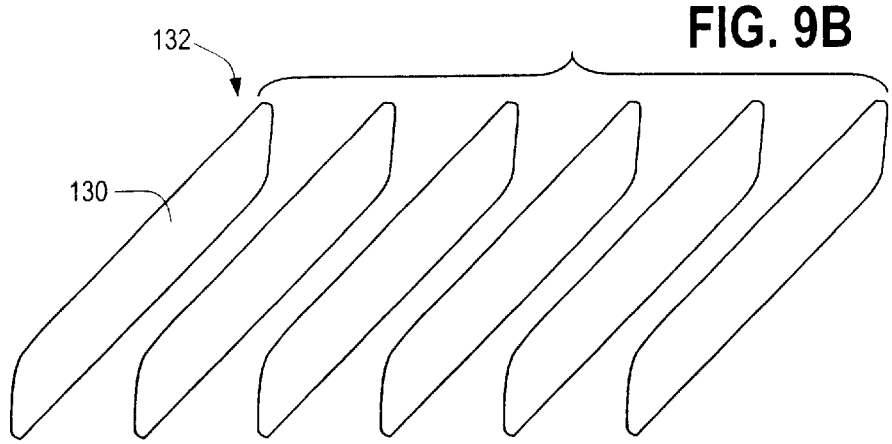
Figure 9C:
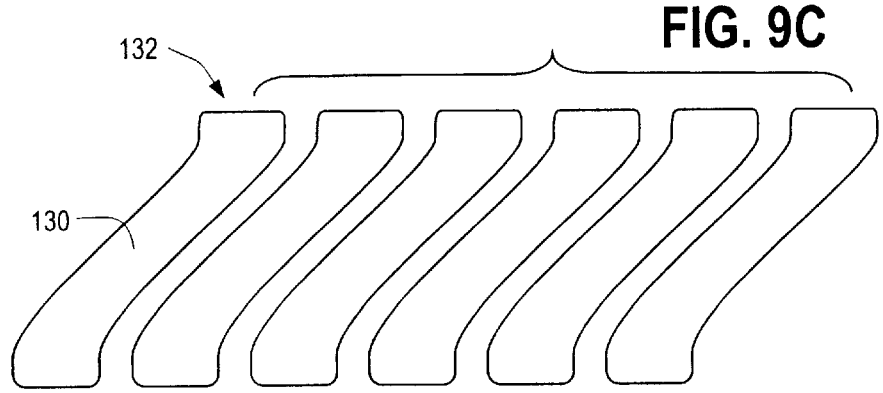
Figure 9D:
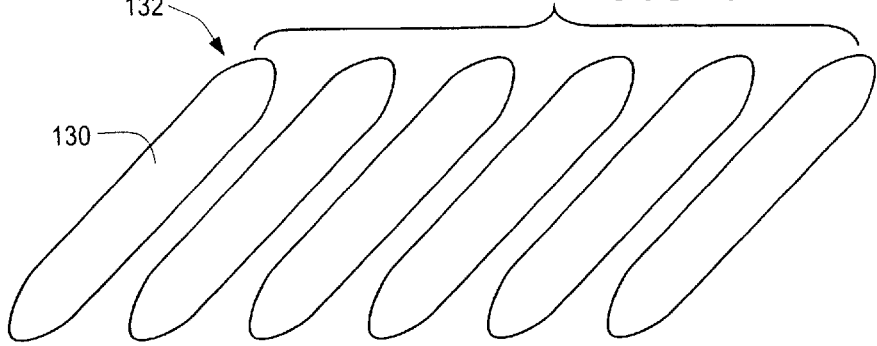

In contrast, FIG. 8C illustrates a cross-sectional side view of a contour of a corrugation 100 that is not preferred. In this configuration, the height 110 of the corrugation 100 tapers gradually from its full height 114 until the radius of curvature 116 where it meets either the inlet portion or the outlet portion. Note that the gradual contour of radius of curvature 113 makes for a stiffer corrugation, which is undesirable. In FIG. 8C, the radius of curvature 113 is significantly greater than the radius of curvature 116.

The configurations defined above illustrate specific embodiments of the invention from the point of view of performance. However, some of these embodiments may impose certain manufacturing and tooling complexities.

Typically, pipe couplings having the corrugations described above may be manufactured using a hydroforming process, as is known in the art. This process is performed by placing a straight cylindrical tube in a die and pressurizing the tube beyond the elastic limit of the material from which the tube is formed. The die supports the tube in locations where no deformation is to occur, and contains voids where deformations do occur.

The span or distance between supported sections of the tube effects the pressure needed to induce the tube to take on or deform to the shape of the die. The greater the span, the lower the required pressure. Conversely, the shorter the span, the greater the required pressure. A corollary to this is that given the same pressure within the tube, the tube will have a greater deformation in areas of the die where the supported sections are far apart, and a lesser deformation where they are close together. In other words, a tube supported by two sections of the die that are relatively far apart might deform in a preferable fashion, similar to FIGS. 8A and 8B, while the same tube subjected to the same pressure but supported by sections that were close together, may deform in an undesirable way as depicted in FIG. 8C.

The shapes of the corrugations having transition areas 70 shown in FIGS. 7A–7E will now be described assuming that the corrugations are "coming out" of the page in the positive z-axis direction. A die required for making such corrugations would have voids in the areas corresponding to the deformed areas of the tubes, which are defined as the corrugations themselves, and which are shown in the "enclosed borders" of the illustrations of FIGS. 7A–7E. Conversely, the die would have supporting structures or walls in the areas of the tube that are not subject to deformation.

With respect to the corrugations having transition areas illustrated in FIGS. 7A, 7B, and 7D, the supporting sections of the die are found to be closer together as the termination area of the corrugation is approached. Therefore the distance between the supporting sections becomes smaller. This means that a greater pressure is need at this location to obtain the same amount of deformation. However, because the pressure within the die is constant, the pressure used to obtain a preferable height or contour of the corrugation in accordance with FIGS. 8A and 8B along the length of the corrugation may yield an undesirable height profile (FIG. 8C) toward the ends of the corrugation at the transition area.

Therefore, modifications to the geometry of the transition areas shown in FIGS. 7A–7E may be made to provide a preferable height or contour of the corrugation in accordance with FIGS. 8A and 8B. Note that the corrugation 100 having the transition area depicted in FIG. 7C would not be subject to the above-described situation because the distance or span between the supporting sections of the die is greater.

With respect to producing the dies for forming the corrugations described above, a solid heavy walled pipe (die pipe) is used initially. The die pipe would then be machined to create the appropriate voids in the shape of the desired geometry. However, it may be difficult and/or expensive to machine the die pipe to obtain the geometries shown in FIGS. 7A–7E because the die pipe would have to pass under a cutting tool and traverse the path of the desired geometry. This would require complex machine fixtures, and even very sophisticated machining would need to estimate the geometries using small segments of the geometry to define discrete motions. This may be avoided, in part, by determining how far from the ideal geometry can one deviate while still maintaining the desired function of the resulting corrugation and transition area.

Referring now to FIGS. 9A–9D, the corrugations 130 shown may include an approximated transition area 132 shape, which may simplify the manufacture and construction of the die pipe used to make the pipe coupling. The corrugations 130 shown in FIGS. 9A–9D correspond to the corrugations 100 shown in FIGS. 7A–7D, except that the shape of the transition area has been approximated. This may reduce the cost and simplify the manufacturing process with respect to the manufacturing die. The shape of the transition area 132 of FIGS. 9A–9D have a uniform radius, in contrast to the elliptical shape of the transition areas 70 of FIGS. 7A–7E. It can be appreciated that the geometries or shape of the transition areas 132 depicted in FIGS. 9A–9D do not significantly depart from those shown in FIGS. 7A–7E. Accordingly, the performance of such a pipe coupling using the approximated configuration illustrated in FIGS. 9A–9D is similar to the ideal performance yielded by the configuration illustrated in FIGS. 7A–7E, yet the manufacturing costs and complexity is reduced.

Referring now to FIGS. 10A–10D, alternate embodiments of the geometry of a transition area 140 of corrugations 144 are shown, which geometries may further simplify the fabrication of the dies and enhance forming the corrugations. In these specific embodiments, the size of the end radius of curvature of the termination area 140 is increased, and the size of the transition radius of curvature is decreased to the point where both are equal. This affords two benefits. By using the same radius of curvature for both, the geometry to be traced by the cutting tool is simplified and a single cutting tool can be used, thus reducing the need for tooling changes. The second benefit applies to the geometry itself. With the approximation as described, the span of the supporting die segments is increased. This permits the corrugations 144 to be formed with a greater height in the z-axis than the aforementioned embodiments. Note that the transition area 140 shown in FIGS. 10A and 10C correspond to the transition area depicted in FIGS. 6C and 6A, respectively.

Figure 10A:
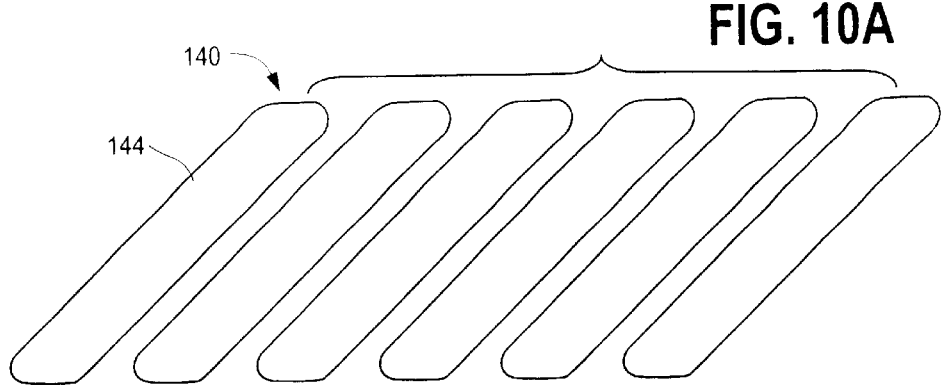
FIGS. 10A–10D are pictorial views of further alternate embodiments of approximations of the shape of the transition area of the corrugations.
Figure 10B:
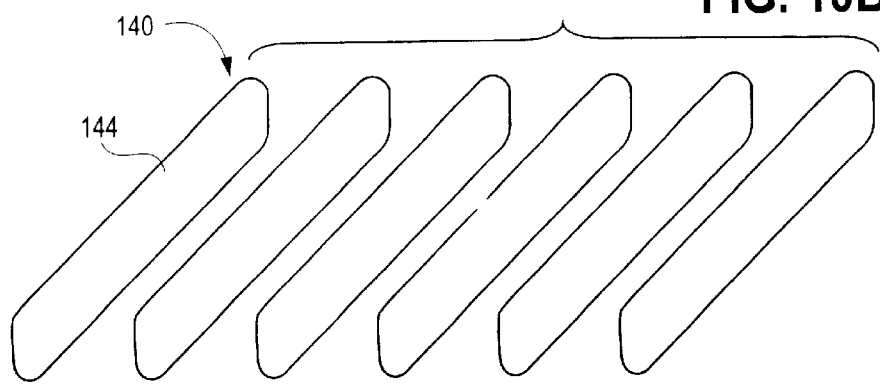
Figure 10C:
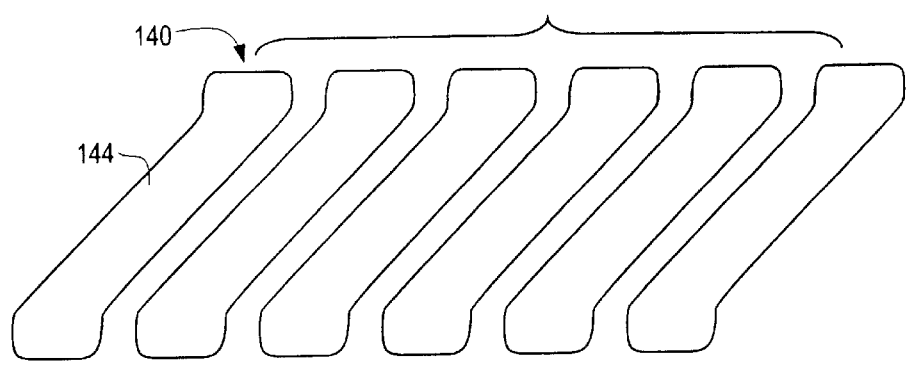
Figure 10D:
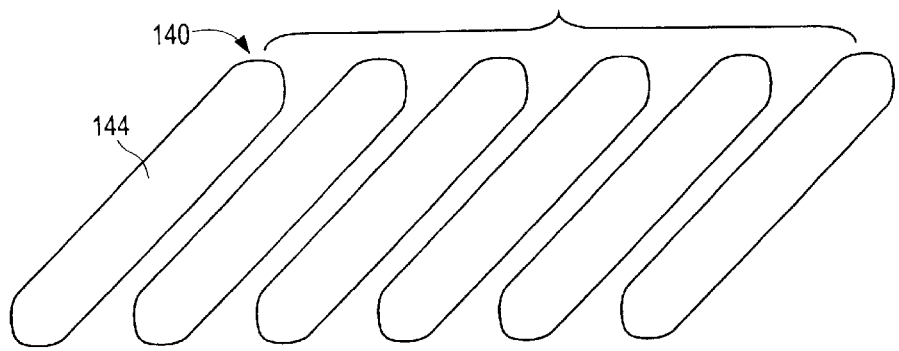
Figure 11A:
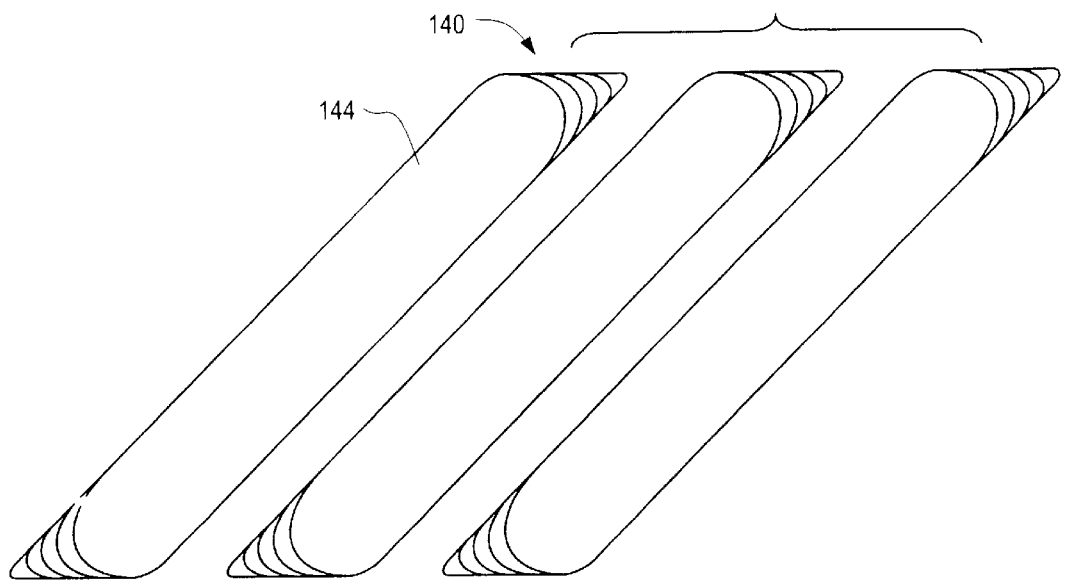
FIGS. 11A–11B are pictorial views of alternate embodiments of approximations of the transition area made by varying the radius.
Figure 11B:
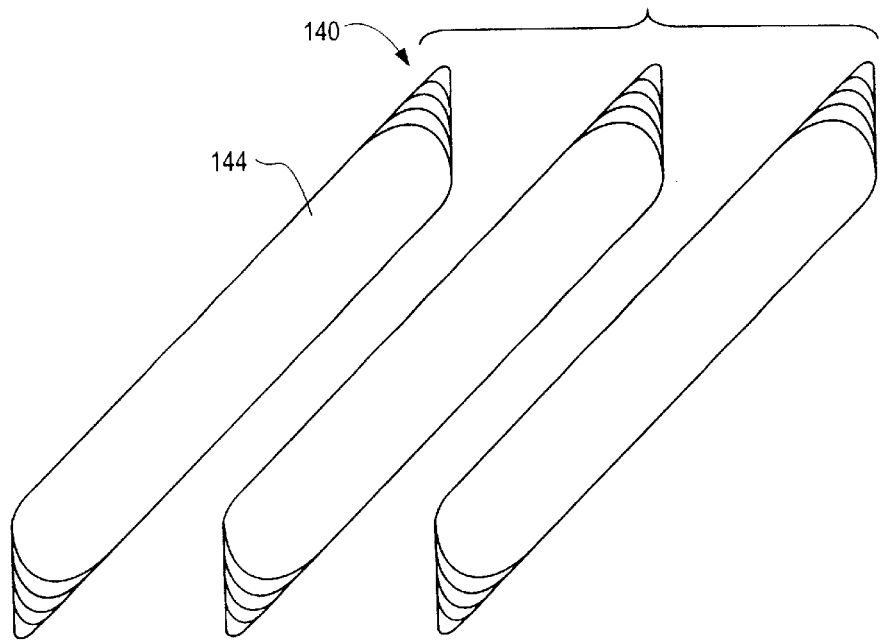

Referring now to FIGS. 11A and 11B, these figures illustrate the resulting shapes of the transition areas 140 of FIGS. 10A and 10B, but with graduated sizes of the radius of the transition area. Such approximations of the geometry of the shape of the transition area 140 may be derived by varying the radii and/or including straight sections between radii, as illustrated in FIG. 6B. It can be appreciated that many geometries can be derived using various approximations.

Specific embodiments of a corrugated pipe coupling according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A pipe coupling for joining two portions of a pipe, the pipe coupling comprising:

an inlet portion;

an outlet portion disposed opposite the inlet portion;

an intermediate portion disposed between the inlet and outlet portions for providing relative movement between the inlet portion and the outlet portion;

the intermediate portion having a plurality of corrugations disposed about a circumference of the pipe coupling;

each corrugation having first and second arms diverging from a common vertex toward the inlet portion and outlet portion, respectively;

the arms diverging at substantially a forty-five degree angle forming a V-shape; and each arm terminating at a transition area where each arm of the corrugation blends with the inlet portion and outlet portion, respectively.

2. The pipe coupling according to claim 1 wherein said intermediate portion provides said relative movement between the inlet portion and the outlet portion in torsion.

3. The pipe coupling according to claim 1 wherein the intermediate portion permits a length of the pipe coupling to remain substantially constant during twisting or torsional movement between the inlet portion and the outlet portion.

4. The pipe coupling according to claim 1 wherein a distance from a first end of the inlet portion to a first end of the outlet portion remains substantially constant during twisting or torsional movement of the intermediate portion.

5. The pipe coupling according to claim 1 further including at least one annular corrugation wherein the intermediate portion facilitates compression, extension, bending, and twisting movement between the inlet portion and the outlet portion.

6. The pipe coupling according to claim 1 wherein each arm of the corrugations is oriented at substantially a forty-five degree angle relative to a longitudinal axis of the pipe.

7. The pipe coupling according to claim 1 wherein each arm of the corrugations is oriented at an angle between forty degrees and fifty degrees relative to a longitudinal axis of the pipe.

8. The pipe coupling according to claim 1 wherein the verticies of the plurality of corrugations are aligned in a plane perpendicular to a longitudinal axis of the pipe coupling.

9. The pipe coupling according to claim 1 wherein each corrugation is parallel to an adjacent corrugation and wherein the plurality of corrugations are disposed continuously around a circumference of the pipe coupling.

10. The pipe coupling according to claim 1 wherein the vertices of the plurality of corrugations are aligned with a longitudinal axis of the pipe coupling.

11. The pipe coupling according to claim 1 wherein the transition area forms a smooth curve from an axis of each arm to either a longitudinal axis of the pipe coupling or an axis perpendicular to the axis of the pipe coupling.

12. The pipe coupling according to claim 11 wherein the smooth curve is in the form of an ellipse.

13. The pipe coupling according to claim 11 wherein the smooth curve is circular.

14. The pipe coupling according to claim 11 wherein the smooth curve is in the form of a second order or third order function.

15. The pipe coupling according to claim 1 wherein the transition area forms a smooth curve from the vertex of the corrugation to either a longitudinal axis of the pipe coupling or an axis perpendicular to the axis of the pipe coupling.

16. The pipe coupling according to claim 15 wherein the smooth curve is in the form of an ellipse.

17. The pipe coupling according to claim 15 wherein the smooth curve is circular.

18. The pipe coupling according to claim 15 wherein the smooth curve is in the form of a circle.

19. The pipe coupling according to claim 15 wherein the smooth curve is in the form of a second order or third order function.

20. The pipe coupling according to claim 1 wherein a height of the corrugation in the transition area has an abrupt taper.

21. The pipe coupling according to claim 1 wherein a height of the corrugation in the transition area changes relatively rapidly.

22. The pipe coupling according to claim 1 wherein a height of the corrugation in the transition area is not sharp.

23. The pipe coupling according to claim 1 wherein a height of the corrugation in the transition area has an abrupt taper that is not sharp.

24. The pipe coupling according to claim 1 wherein the transition had a radius of curvature between one-quarter and one-half of a height of the corrugation.

25. The pipe coupling according to claim 1 wherein a shape of the transition area forms a smooth curve that is approximated by a circle.

26. The pipe coupling according to claim 1 wherein a shape of the transition area forms a smooth curve that is approximated by one of a plurality of graduated radii.

27. The pipe coupling according to claim 1 wherein a shape of the transition area forms a smooth curve that is approximated by one of a plurality of graduated radii and straight segments.

28. The pipe coupling according to claim 1 wherein the pipe coupling is used in piping applications selected from the group of piping applications consisting of exhaust systems, HVAC, pressurized fluid flow, pressurized gas flow, and slurry flow.

29. The pipe coupling according to claim 1 wherein the corrugations are formed so as to bulge outward from a centerline of the pipe coupling.

30. The pipe coupling according to claim 1 wherein the corrugations are formed so as to indent inwardly toward a centerline of the pipe coupling.

31. The pipe coupling according to claim 1 wherein each corrugation includes one pair of the arms forming a V-like corrugation.

32. The pipe coupling according to claim 1 wherein each pair of arms of a corrugation further include a mirror-image pair of arms forming a diamond-shaped corrugation, and wherein a plurality of said diamond-shaped corrugations are disposed about a circumference of the pipe coupling, each diamond-shaped corrugation connected at a common vertex.

33. The pipe coupling according to claim 1 wherein each corrugation includes two pair of the arms forming a diamond-like corrugation.

34. A pipe coupling for joining two portions of a pipe, the pipe coupling comprising:

an inlet portion;

an outlet portion disposed opposite the inlet portion;

an intermediate portion disposed between the inlet and outlet portions for providing relative movement between the inlet portion and the outlet portion;

the intermediate portion having a plurality of corrugations disposed about a circumference of the pipe coupling, each corrugation having first and second ends;

each corrugation disposed at substantially a forty-five degree angle relative to a longitudinal axis of the pipe coupling;

the first and second ends of each corrugation terminating at a transition area where each said end blends with the inlet portion and outlet portion, respectively; and the transition area forming a smooth curve defined by a second order or third order function, the transition area extending from an axis of each corrugation to either a longitudinal axis of the pipe coupling or an axis perpendicular to the axis of the pipe coupling.

35. A pipe coupling for joining two portions of a pipe, the pipe coupling comprising:

an inlet portion;

an outlet portion disposed opposite the inlet portion;

an intermediate portion disposed between the inlet and outlet portions for providing relative movement between the inlet portion and the outlet portion;

the intermediate portion having at least one corrugation band disposed about a circumference of the pipe coupling;

each corrugation band formed of a plurality of arms, each arm connected to an adjacent arm at a common vertex, each arm diverging from the common vertex along the circumference of the pipe coupling;

the arms diverging at substantially a forty-five degree angle forming a V-shape; and each vertex terminating at a transition area that forms a smooth curve from the vertex to a longitudinal axis of the pipe coupling.

36. A pipe coupling for joining two portions of a pipe, the pipe coupling comprising:

an inlet portion;

an outlet portion disposed opposite the inlet portion;

first and second intermediate portions disposed between the inlet and outlet portions for providing relative movement between the inlet portion and the outlet portion;

the first intermediate portion having a plurality of corrugations disposed about a circumference of the pipe coupling, each corrugation of the first intermediate portion having first and second arms diverging from a common vertex toward the inlet portion and outlet portion, respectively;

the arms diverging at substantially a forty-five degree angle forming a V-shape; and each arm terminating at a transition area where each arm of the corrugation blends with the inlet portion and outlet portion, respectively; and the second intermediate portion having at least one annular corrugation.

37. The pipe coupling according to claim 36 wherein said first and second intermediate portions provide said relative movement between the inlet portion and the outlet portion in six degrees of freedom.

38. A pipe coupling for joining two portions of a pipe, the pipe coupling comprising:

an inlet portion;

an outlet portion disposed opposite the inlet portion;

an intermediate portion disposed between the inlet and outlet portions for providing relative movement between the inlet portion and the outlet portion;

the intermediate portion having a plurality of corrugations disposed about a circumference of the pipe coupling;

each corrugation having first and second arms diverging from a common vertex toward the inlet portion and outlet portion, respectively;

the arms diverging at substantially a forty-five degree angle forming a V-shape;

each arm terminating at a transition area where each arm of the corrugation blends with the inlet portion and outlet portion, respectively; and the transition area forming a curve described by a second order or third order function, the curve extending from an axis of each arm to either a longitudinal axis of the pipe coupling or an axis perpendicular to the axis of the pipe coupling.

39. The pipe coupling according to claim 34 wherein the smooth curve is in the form of an ellipse.

40. The pipe coupling according to claim 34 wherein the smooth curve is circular.

41. The pipe coupling according to claim 34 wherein a shape of the transition area forms a smooth curve that is approximated by a circle.

42. The pipe coupling according to claim 34 wherein a shape of the transition area forms a smooth curve that is approximated by one of a plurality of graduated radii.

43. The pipe coupling according to claim 1 wherein a shape of the transition area forms a smooth curve that is approximated by one of a plurality of graduated radii and straight segments.

44. The pipe coupling according to claim 34 wherein each corrugation includes one pair of arms forming a V-like corrugation.

45. The pipe coupling according to claim 44 wherein each pair of arms further includes a mirror-image pair of arms forming a diamond-shaped corrugation, and wherein a plurality of said diamond-shaped corrugations are disposed about a circumference of the pipe coupling, each diamond-shaped corrugation connected at a common vertex.

46. The pipe coupling according to claim 44 wherein the transition area forms a smooth curve from an axis of each arm to either a longitudinal axis of the pipe coupling or an axis perpendicular to the axis of the pipe coupling.

47. The pipe coupling according to claim 38 wherein each arm of the corrugations is oriented at an angle between forty degrees and fifty degrees relative to a longitudinal axis of the pipe.

48. The pipe coupling according to claim 38 wherein each corrugation is parallel to an adjacent corrugation and wherein the plurality of corrugations are disposed continuously around a circumference of the pipe coupling.

49. The pipe coupling according to claim 38 wherein the smooth curve is in the form of an ellipse.

50. The pipe coupling according to claim 38 wherein the smooth curve is circular.

51. The pipe coupling according to claim 38 wherein a shape of the transition area forms a smooth curve that is approximated by a circle.

52. The pipe coupling according to claim 38 wherein a shape of the transition area forms a smooth curve that is approximated by one of a plurality of graduated radii.

53. The pipe coupling according to claim 38 wherein a shape of the transition area forms a smooth curve that is approximated by one of a plurality of graduated radii and straight segments.

54. The pipe coupling according to claim 38 wherein each pair of arms of a corrugation further include a mirror-image pair of arms forming a diamond-shaped corrugation, and wherein a plurality of said diamond-shaped corrugations are disposed about a circumference of the pipe coupling, each diamond-shaped corrugation connected at a common vertex.

55. The pipe coupling according to claim 38 wherein each corrugation includes two pair of the arms forming a diamond-like corrugation.

* * * * *